United States Patent [19]

Mann

[11] 4,121,685

[45] Oct. 24, 1978

[54] APPARATUS FOR CONTROLLING THE TRAVELING SPEED OF A MOTOR VEHICLE

[75] Inventor: Arnold Mann, Bieber, Germany

[73] Assignee: VDO Adolf Schindling AG, Frankfurt am Main, Germany

[21] Appl. No.: 820,712

[22] Filed: Aug. 1, 1977

[30] Foreign Application Priority Data

Aug. 13, 1976 [DE] Fed. Rep. of Germany ....... 2636540

[51] Int. Cl.² ............................................ B60K 31/00
[52] U.S. Cl. ................................ 180/108; 123/103 R; 137/47
[58] Field of Search .......................... 180/105 R, 108; 123/97 R, 102, 103; 137/47, 50, 58

[56] References Cited

U.S. PATENT DOCUMENTS

| 3,088,538 | 5/1963 | Brennan | 123/103 R X |
|---|---|---|---|
| 3,109,507 | 11/1963 | McMurray | 123/103 R X |
| 3,332,406 | 7/1967 | Perry | 180/108 X |
| 3,340,950 | 9/1967 | Hopengarten | 180/105 R |
| 3,405,779 | 10/1968 | Johnston | 180/108 |
| 3,885,644 | 5/1975 | Seidler | 123/102 X |
| 3,921,751 | 11/1975 | Sakakibara | 123/102 X |

*Primary Examiner*—Joseph F. Peters, Jr.
*Assistant Examiner*—Terrance L. Siemens
*Attorney, Agent, or Firm*—Martin A. Farber

[57] ABSTRACT

An apparatus for controlling the traveling speed of a motor vehicle with an electric control unit acted upon by a speed dependent signal, which unit compares the actual traveling speed with a predetermined desired traveling speed, and upon a deviation transmits a signal which is dependent on the size of the deviation to a control stage. The control stage comprises a pneumatic actuator which acts on an element, preferably a throttle valve, which influences the ratio of a fuel-air mixture fed to the motor of the vehicle, as well as two electromagnetically actuatable valves coordinated to the actuator, the valves enabling the actuator to be admitted with reduced- and above atmospheric- pressure, respectively, or reduced- and normal pressure, respectively. The control stage includes an electromagnetic system, which system comprises a U-shaped yoke carrying an excitation coil and an armature immerging between the legs of the yoke. The armature is pivotally mounted for smooth pivoting from a rest position, in which position both of the two valves are closed, against the force of a spring, which force is dependent on the stroke of the actuator, into operating positions, respectively, in which positions one of the two valves is opened and the other valve is closed. The armature is supported by two axially adjustable pivot pins on a stationary bearing surface and is controlled at least on one free end, and a shoulder is provided which limits its movement opposite to the direction of the force of the spring.

8 Claims, 3 Drawing Figures

APPARATUS FOR CONTROLLING THE TRAVELING SPEED OF A MOTOR VEHICLE

The invention relates to an apparatus for controlling the traveling speed of a motor vehicle with an electric control unit acted upon by a speed dependent signal, which unit compares the then present traveling speed with a predetermined desired traveling speed, and upon a deviation transmits a signal which is dependent on the size of the deviation to a control stage. The control stage comprises a pneumatic actuator acting on an element, preferably the throttle valve, which influences the ratio of the fuel-air mixture fed to the motor of the vehicle, as well as two electromagnetically actuatable valves coordinated to the actuator. By means of the valves, the actuator is enabled so as to be admitted with reduced pressure and an above atmospheric pressure, respectively, or normal pressure, respectively; whereby the control stage contains an electromagnetic system which system comprises a U-shaped yoke carrying an excitation coil and an armature immerging between the legs of the yoke, which armature is pivotable jerk-free or smoothly from a rest position (in which both valves are closed) against the force of a spring, which force is dependent on the stroke of the actuator, into operating positions, in which operating positions, respectively, one of the two valves is opened and the other valve is closed, particularly according to U.S. Pat. No. 4,039,043, filed Mar. 9, 1976 which is hereby incorporated herein by reference.

As set forth in the above-mentioned patent application, such devices have a comparatively simple construction and a reduced number of components. Moreover the pressure medium consumption of these devices is substantially lower than that of other known devices.

It is another object of the present invention to further simplify the constructive design and assembly of the device, and to further reduce the consumption of pressure medium.

It is another object of the present invention to aid the solution of the above-mentioned object, in the manner that the armature (36) is supported by means of two axially adjustable pivot pins (88,89) on a stationary bearing or support surface (31), and is controlled or guided at least on one free end, and means (90) are provided which limit its movement opposite to the direction of the force of the spring thereon.

By this bearing or support application in accordance with the present invention of the armature, not only is the assembling or mounting of the device considerably simplified, but also as yet to be pointed out, a number of components are saved, both of which favorably affects the production costs. As it furthermore has shown, beyond that the pressure medium consumption is significantly reduced. A particular advantage of the measures in accordance with the invention reside in that the response sensitivity of the control unit is greater by three to four times than that of the device described in the above mentioned patent application.

With a device with valves and an electromagnetic system arranged on the inside of one of the two front walls of the actuator housing, according to an advantageous embodiment form of the invention, the armature is mounted on the front wall (31) and an inwardly projecting shoulder (90) is provided on the cylindrical part of the housing (58) in the vicinity of the front wall (31) which shoulder is adapted to limit the armature movement.

By forming the shoulder on the cylindrical part of the housing and by mounting the armature on the housing front wall, the use of additional components for limitating the armature movement is made unnecessary as well as is a counterbearing for the armature.

The axially adjustable pivot pins are advantageously formed as bearing bolts (88,89). In this manner the adjustment of the valve play, which is brought about by means of the adjustable pivot pins, can be accomplished particularly exactly.

According to a further advantageous embodiment of the invention, the end of the armature which is remote, pointing away from the yoke is guided between two spaced opposite walls of a chamber (83), a front side of which chamber forms the armature end. By adoption and introduction of this air chamber damping or cushioning, the normal counter-weight seated on that end of the armature remote from the yoke can be eliminated, whereby the component expense is further lowered and the assembling of the device is further simplified.

Moreover it has also proven advantageous to mount on the armature, a plate (91) pivotable thereon about an axis parallel to the armature pivot axis, the spring (50) being supported on this plate. By this measure, a circularly formed support surface of the spring on the armature, as it exists with the embodiment device in accordance with the previously mentioned patent application, is converted into a linear-shaped effective support surface with longitudinal axis thereof parallel to the pivot axis of the armature, which leads to an improvement in the control ratio, conditions and action and consequently to a further reduction of the pressure medium consumption. It has also proven advantageous to provide the plate (91) with two banner-shaped projections (92) which are intermittently tapered and to equip the armature with corresponding slots for reception of these projections. For facilitating the assembly of the plate on the armature and in order to prevent an unintended separation of the armature and the plate, most advantageously the projections are bent at their free ends.

With the above and other objects and advantages in view, the present invention will become more clearly understood from the following description of a preferred embodiment thereof and the accompanying drawings, of which:

Figure 1:
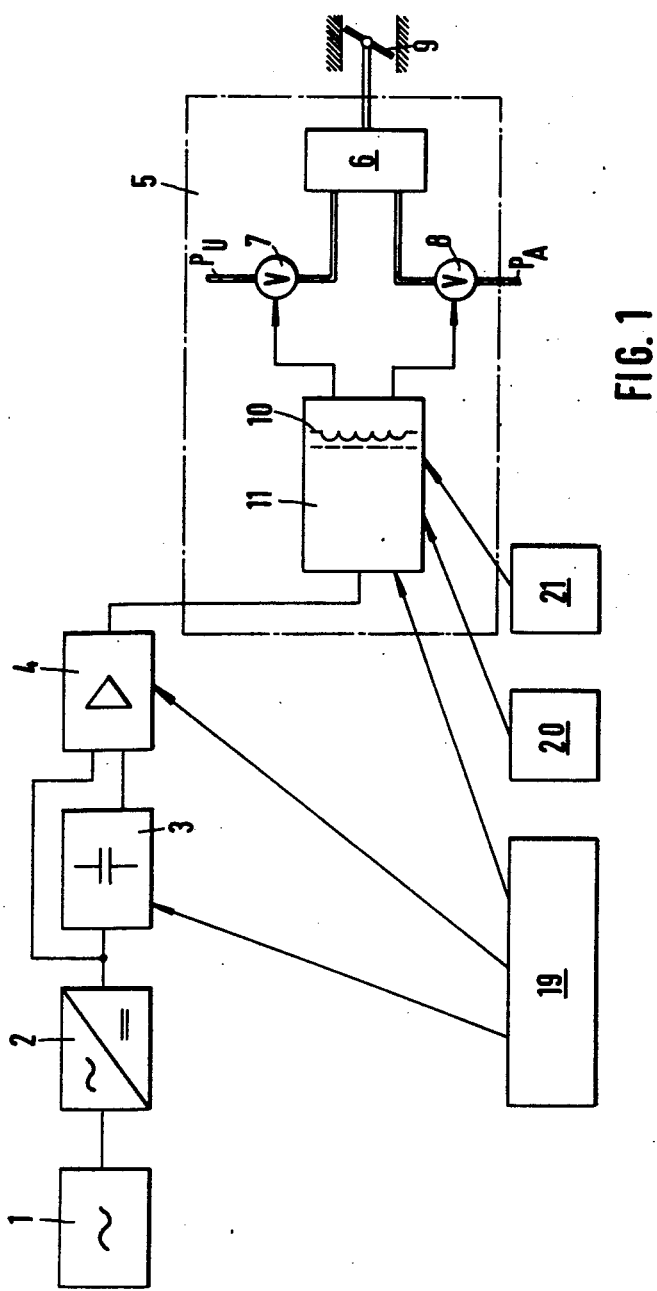
FIG. 1 is a schematic circuit diagram of the device with the control stage and the actuator.

Referring now to the drawings, as evident from FIG. 1, a driving or traveling speed control device includes: a speed pick-up or transmitter 1, the output signal of which has a frequency proportional to the traveling speed of the vehicle; a frequency voltage-transformer 2 connected to the transmitter 1, the output signal of the transformer 2 being fed in one path indirectly to a differential amplifier 4 via a storage or memory unit 3 and in another path directly to the differential amplifier 4, the latter comparing therein the instantaneous actual value of the speed with a speed nominal value. In the case of a deviation of the actual value from the nominal value, the potential in the comparator output is raised or lowered, the comparator output being connected with a control stage 5.

The control stage 5 includes a pneumatic actuator 6, which is coupled by means of two valves 7 and 8 admissible or operatively in communication with a reduced pressure or a partial vacuum $P_U$ and with the ambient air $P_A$, respectively, the actuator 6 also being coupled to the throttle valve 9 in the motor of the vehicle. An electromagnetic system 10 is provided for the actuation of the valves 7 and 8, the system 10 being disposed in a control circuit 11.

The control of the entire control device by the driver of the motor vehicle is brought about by means of a control or operating unit 19, which contains a switch to be operated by the vehicle operator, as well as by the brake light switch 20 and, under circumstances if need be, a switch 21 in operative connection with the clutch of the vehicle. Further details for this are set forth in the embodiments of the above-mentioned patent which is hereby incorporated by reference.

Figure 2:
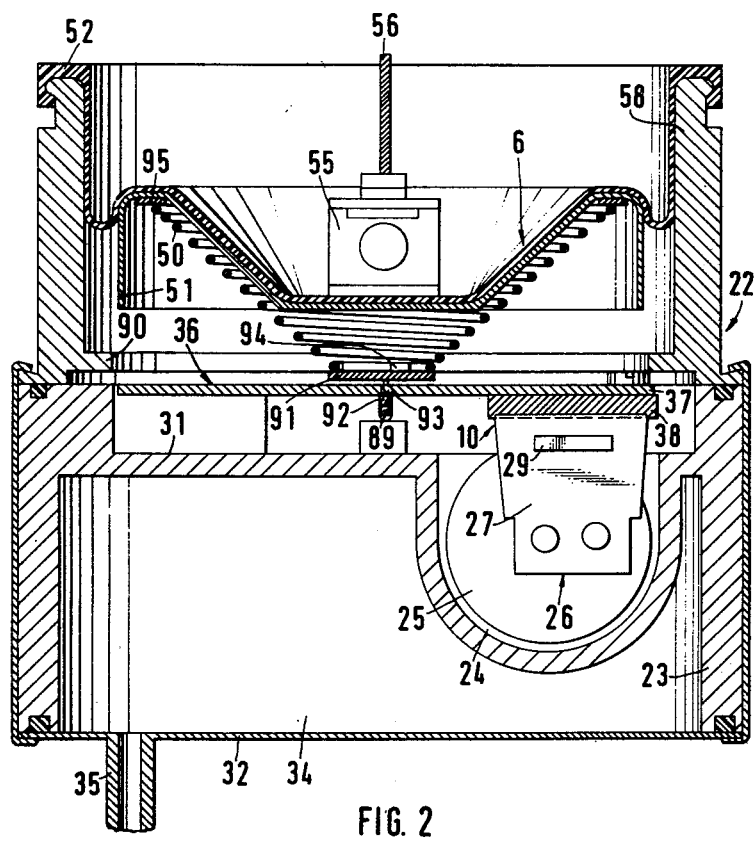
FIG. 2 is a longitudinal section through the control stage of the device according to FIG. 1, the control stage forming a unit with the actuator.
Figure 3:
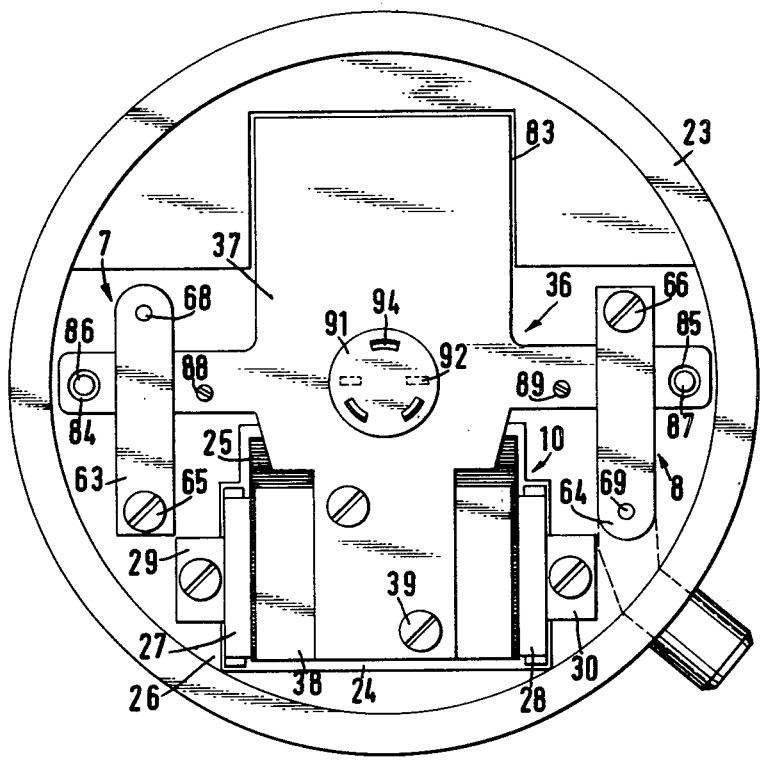
FIG. 3 is a plan view of the control stage of the device according to FIG. 1 with the actuator removed.

As evident from FIGS. 2 and 3, the actuator 6 with the valves 7 and 8 together with the electromagnetic system 10 of the control stage 5 form a construction unit 22. The construction unit 22 comprises a first housing part 23 forming a chamber 24 for the excitation coil 25 of the electromagnetic system 10. The excitation coil 25 is seated in a yoke 26, the latter having two legs 27 and 28, each provided with a projection 29 and 30, respectively, which serve to secure the yoke 26 on the front wall or side 31 of the housing part 23. The end of the housing part 23 opposite to the front side 31 is closed by a cover 32. The space formed thereby constitutes a pressure reservoir 34, which is admitted with a reduced pressure via a connection conduit 35.

An armature 36 of the electromagnetic system 10 is mounted on the front side 31 of the housing part 23. The armature 36 comprises a four-armed main part 37, on one arm of which, an armature plate 38 is fastened by means of two screws 39, which armature plate 38 is operatively controlled and guided up and down insertable between the legs 27 and 28 of the yoke 26. The arm of the main part 37 which is opposite to the arm having the armature plate 38 thereon forms a damper vane, which vane closes a damping chamber 83. The damper vane arm of the armature is guided between the side walls of the chamber 83, which walls are opposite to each other (FIG. 3). The damper vane arm of the armature constitutes the front or face side of the damping or cushioning chamber 83, the latter being defined in the housing part 23 between the front wall 31, the opposite side walls and the damper vane end of the armature 36. Each of the two other arms of the main part 37, which other arms are opposite one another, is formed with a centering opening 84 and 85, respectively, through which a pin 86 and 87, respectively, projects, which pins 86 and 87 are formed on the housing part 23. Moreover an adjustable bearing bolt 88 and 89, respectively, is seated in each of these two arms, by means of which the armature 36 is supported on the front side 31 of the housing. By adjusting these bolts or screws 88 and 89, the play of the valves 7 and 8 can be set or adjusted, the vavles being actuated by these corresponding arms of the armature. The bearing or positioning security of the armature takes place by means of an abutment shoulder 90 which is formed on the second, cup-shaped housing part 58 of the construction unit 22 in the vicinity of the front side 31 of the housing part 23.

The conically-formed actuator spring 50 constituting a compression spring, is supported on one end on the base of a sheet metal pot 51, the latter being provided for supporting a roll membrane 52, and on the other end the spring is supported on a plate 91, which plate has two flag- or banner-like projections or studs 92, which projections taper unsteadily or intermittently. The projections 92 engage in corresponding slots 93 in the armature 36. The flag-like projections 92 are bent on their free ends by approximately 120 angular degrees (cf. FIG. 2). Furthermore upwardly bent tabs 94 are provided, stamped out from the plate 91, which tabs 94 serve for the mounting or positional security of the spring 50 on the plate 91. The device can be calibrated by insertion of rings or washers 95 between the base of the sheet metal pot 51 and the actuator spring 50. A holder 55 is disposed on the other side of the sheet metal pot 51, which holder 55 is fastened centrally on the sheet metal pot 51 clamping the roll membrane 52 on the sheet metal pot 51. A pulling traction cable 56 engages or grips on holder 55, the cable being in connection with the throttle valve 9 (FIG. 1). A guide rod for the sheet metal pot 51 and the roll membrane 52, respectively, is not required with this type of embodiment.

Both of the valves 7 and 8 are principally constructed alike. Each of the two valves 7 and 8 comprises a plate spring 63 and 64, respectively, which is secured on one end by means of a screw 65 and 66, respectively, each screw engaging on a pin projection (not shown) formed on the front side 31 of the housing part 23, and on its other end each plate spring carries a closure or sealing member 68 and 69, respectively, made of a soft rubber elastic material. The sealing member 68 and 69, respectively, is pressed by the plate spring 63 and 64, respectively, (the plate springs being held prestressed) in a sealing direction against a respective valve body (not shown), the latter being seated in the front wall 31 of the housing part 23, and the respective valve body communicating with reduced pressure $P_U$ in the reservoir 34 and ambient pressure $P_A$, respectively. Each of the two plate springs 63 and 64, respectively, stands in operative connection with a tab which is bent upwardly from the armature 36 for operating the valves 7 and 8 dependent on the pivoting of the armature due to the position of the armature plate 37 relative to the legs of the yoke.

The control stage 5 according to FIGS. 1-3, is illustrated in the balanced condition, that is the pulling or drawing force exerted on the armature 36 by the yoke 26 is in equilibrium with the pulling force exerted by the reduced pressure or partial vacuum on the roll membrane 52, which latter force acts on the armature via the actuator spring 50. In this condition, the armature 36, which vibrates as a result of the pulse current flowing through the excitation coil 25, is in its rest position range and both valves 7 and 8 are closed. A pressure medium consumption does not occur.

If now the actual speed of the vehicle increases, for example where the vehicle arrives on a street portion with a downgrade, the average value of the current flowing through the excitation coil 25 is reduced. This has the result that the pulling or attractive force exerted by the yoke 26 on the armature 36 becomes smaller and as a result the armature plate 38 emerges out from the space between the two legs 27 and 28. In this manner, the armature pivots along its pivot axis defined by a line through the pivot pins 88, 89 and the valve 8 opens and ambient air flows into the upper chamber formed by and between the front side 31 of the housing part 23, the housing part 58 and the roll membrane 52. This causes a reduction of the pulling force exerted by the reduced pressure or partial vacuum on the roll membrane 52, and the roll membrane 52 migrates or creeps upwardly. Thereby the throttle valve 9 is pivoted by means of the pulling cable in the sense of a speed reduction, and simultaneously the force acting on the armature plate 38 by means of the actuator spring 50 is reduced. Since the linearly effective action of the spring 50 on the armature 36 is defined by the line through the projections 92, and since this line is laterally off-set parallel to the pivot axis (88,89) of the armature, this reduction of the force of the spring 50 on the armature 36 results in a pivoting back of the armature and armature plate 38 in the direction toward its rest position range, until the above described equilibrium condition is again attained.

If now the actual speed of the vehicle again reduces, for example because the vehicle arrives on a level road part, this reduces the pulse period of the series of pulses emitted from the comparator which leads to an increase of the average value of the current flowing through the excitation coil 25. The armature plate 38 is thus drawn deeper between the two yoke legs 27 and 28, and thereby pivoting the armature 36 about the pivot axis defined by the pivot pins 88, 89 such that the valve 7 is opened. The upper chamber is admitted with and communicates with the reduced pressure in the reservoir 34 via the opened valve 7, and the roll membrane 52 migrates downwardly. In this manner, the force acting on the armature 36 by the actuator spring 50 increases, so that the armature 36 is pivoted back in the direction of its rest position range. When it reaches its rest position range, the above described equilibrium condition prevails. The corresponding occurs when the vehicle is to be brought to a higher or lower speed without hitting the gas pedal or the brake by actuation of the appropriate switch in the operating or control unit 19. In this manner the stored nominal speed changes by actuation of the corresponding switch.

While there has been disclosed one embodiment of the invention this embodiment is given by example only and not in a limiting sense.

I claim:

1. An apparatus for controlling the traveling speed of a motor vehicle with an electric control unit acted upon by a speed dependent signal, which unit compares the actual traveling speed with a predetermined desired traveling speed and upon a deviation transmits a signal which is dependent on the size of the deviation to a control stage which acts on an element, preferably a throttle valve, which influences the ratio of a fuel-air mixture fed to a motor of the vehicle, comprising a control stage including an actuator means performing a stroke and for actuating the element,
two electromagnetically actuatable valve means operatively coordinated to said actuator means for admitting said actuator means with reduced- and above atmospheric- pressure, respectively, or reduced- and normal pressure, respectively,
said control stage further comprising an electromagnetic system comprising a U-shaped yoke having legs, an excitation coil carried by said yoke and an armature means operatively cooperating therewith immerging between said legs,
spring means for biasing said armature means and having a spring force dependent on the stroke of said actuator means,
said armature means being pivotally mounted for smooth pivoting from a rest position in which both of said two valve means are closed, against the force of said spring means into operating positions, respectively, in which one of said two valve means is opened and the other of said two valve means is closed,
a stationary bearing surface,
two axially adjustable pivot pins supporting said armature means on said stationary bearing surface,
said armature means has at least one free end and is guided on said at least one free end, and
means for limiting the movement of said armature means opposite to a direction of the spring force.

2. The apparatus, as set forth in claim 1, further comprising
an actuator housing having two front walls,
said electromagnetic system and said valve means are mounted on one of said front walls of said actuator housing,
said armature means is mounted on said bearing surface, the latter constituting said one of said front walls,
said housing includes a cylindrical housing part disposed above said one front wall, said cylindrical housing part includes an inwardly projecting shoulder in a vicinity of said one front wall, said shoulder constitutes said means for limiting the movement of said armature means.

3. The apparatus, as set forth in claim 1, wherein said adjustable pivot pins comprise bearing bolts.

4. The apparatus, as set forth in claim 1, wherein said armature means has an end pointing away from said yoke,
said housing includes walls defining a chamber, said walls include two walls opposite one another,
said end of said armature means is guided between said two walls,
said chamber includes a front side, the latter forms said end of said armature means.

5. The apparatus, as set forth in claim 1, wherein said two pivot pins define an armature pivot axis,
a plate is pivotally mounted on said armature means about an axis parallel to said armature pivot axis,
said spring means is supported on said plate.

6. The apparatus, as set forth in claim 5, wherein said plate has two banner-like projections, the latter taper intermittently,
said armature means is formed with two corresponding slots, said projections are received through said slots, respectively.

7. The apparatus, as set forth in claim 6, wherein said projections have free ends, respectively, and said free ends are bent.

8. The apparatus, as set forth in claim 1, wherein said armature means is formed with two enlarged centering openings,
two stationary pins projecting through said centering openings, respectively.

* * * * *